United States Patent
Webel et al.

(10) Patent No.: US 11,029,742 B2
(45) Date of Patent: Jun. 8, 2021

(54) MITIGATING VOLTAGE DROOP

(71) Applicant: International Business Machines Corporation, Armonk, NY (US)

(72) Inventors: Tobias Webel, Schwaebisch-Gmuend (DE); Preetham M Lobo, Bangalore (IN); Alper Buyuktosunoglu, White Plains, NY (US); Ramon Bertran Monfort, New York, NY (US); Pradeep Bhadravati Parashurama, Bhadravati (IN); Archit Kapoor, Bareilly (IN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 16/371,202

(22) Filed: Apr. 1, 2019

(65) Prior Publication Data

US 2020/0310516 A1 Oct. 1, 2020

(51) Int. Cl.
| | |
|---|---|
| *G06F 1/26* | (2006.01) |
| *G06F 1/32* | (2019.01) |
| *G06F 1/3206* | (2019.01) |
| *G06F 9/38* | (2018.01) |

(52) U.S. Cl.
CPC .......... *G06F 1/3206* (2013.01); *G06F 9/3836* (2013.01); *G06F 9/3869* (2013.01)

(58) Field of Classification Search
CPC ........ G06F 1/28; G06F 1/3206; G06F 9/3836; G06F 9/3869
See application file for complete search history.

(56) References Cited

U.S. PATENT DOCUMENTS

| | | | |
|---|---|---|---|
| 7,937,563 B2 | 5/2011 | Naffziger et al. | |
| 9,628,089 B1* | 4/2017 | Jain | H03K 5/135 |
| 10,171,081 B1 | 1/2019 | Bose et al. | |
| 2009/0063884 A1* | 3/2009 | Weekly | G06F 1/28 |
| | | | 713/340 |
| 2012/0005515 A1 | 1/2012 | Reddi et al. | |
| 2014/0157277 A1* | 6/2014 | Eisen | G06F 1/329 |
| | | | 718/102 |
| 2015/0261270 A1 | 9/2015 | Vikinski et al. | |
| (Continued) | | | |

FOREIGN PATENT DOCUMENTS

JP 2017534939 A 11/2017

OTHER PUBLICATIONS

Biran et al., "Proactive Voltage Droop Reduction and/or Mitigation in a Processor Core", U.S. Appl. No. 15/729,242, filed Oct. 10, 2017.

(Continued)

*Primary Examiner* — Nitin C Patel
(74) *Attorney, Agent, or Firm* — Donald J. O'Brien

(57) ABSTRACT

Embodiments are disclosed for managing voltage droop. The techniques include performing a first determination that a timing margin is less than a first threshold. The techniques also include performing a second determination that an increase in processor activity exceeds a second threshold. Additionally, the techniques include determining that a voltage droop is indicated based on the first determination and the second determination. Further, the techniques include signaling a plurality of throttling circuits for a corresponding plurality of cores of a computer processor to actuate.

17 Claims, 8 Drawing Sheets

(56) References Cited

U.S. PATENT DOCUMENTS

2015/0378412 A1 12/2015 Suryanarayanan et al.
2018/0067541 A1* 3/2018 Chuang .................... G06F 1/26

OTHER PUBLICATIONS

Biran et al., "Proactive Voltage Droop Reduction and/or Mitigation in a Processor Core", U.S. Appl. No. PCT/EP2018/070998, Filed Aug. 2, 2018.

* cited by examiner

600

MITIGATING VOLTAGE DROOP

BACKGROUND

The present disclosure relates to computer processors, and more specifically, to voltage droop in computer processors.

Voltage droop refers to the reduction in available electric current in an electric circuit. Electric circuits can be configured to induce voltage droop by reducing the available current in the electric circuit. However, voltage droop can also occur unintentionally in electric circuits, such as, computer processors.

SUMMARY

Embodiments are disclosed for managing voltage droop. The techniques include performing a first determination that a timing margin is less than a first threshold. The techniques also include performing a second determination that an increase in processor activity exceeds a second threshold. Additionally, the techniques include determining that a voltage droop is indicated based on the first determination and the second determination. Further, the techniques include signaling a plurality of throttling circuits for a corresponding plurality of cores of a computer processor to actuate.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
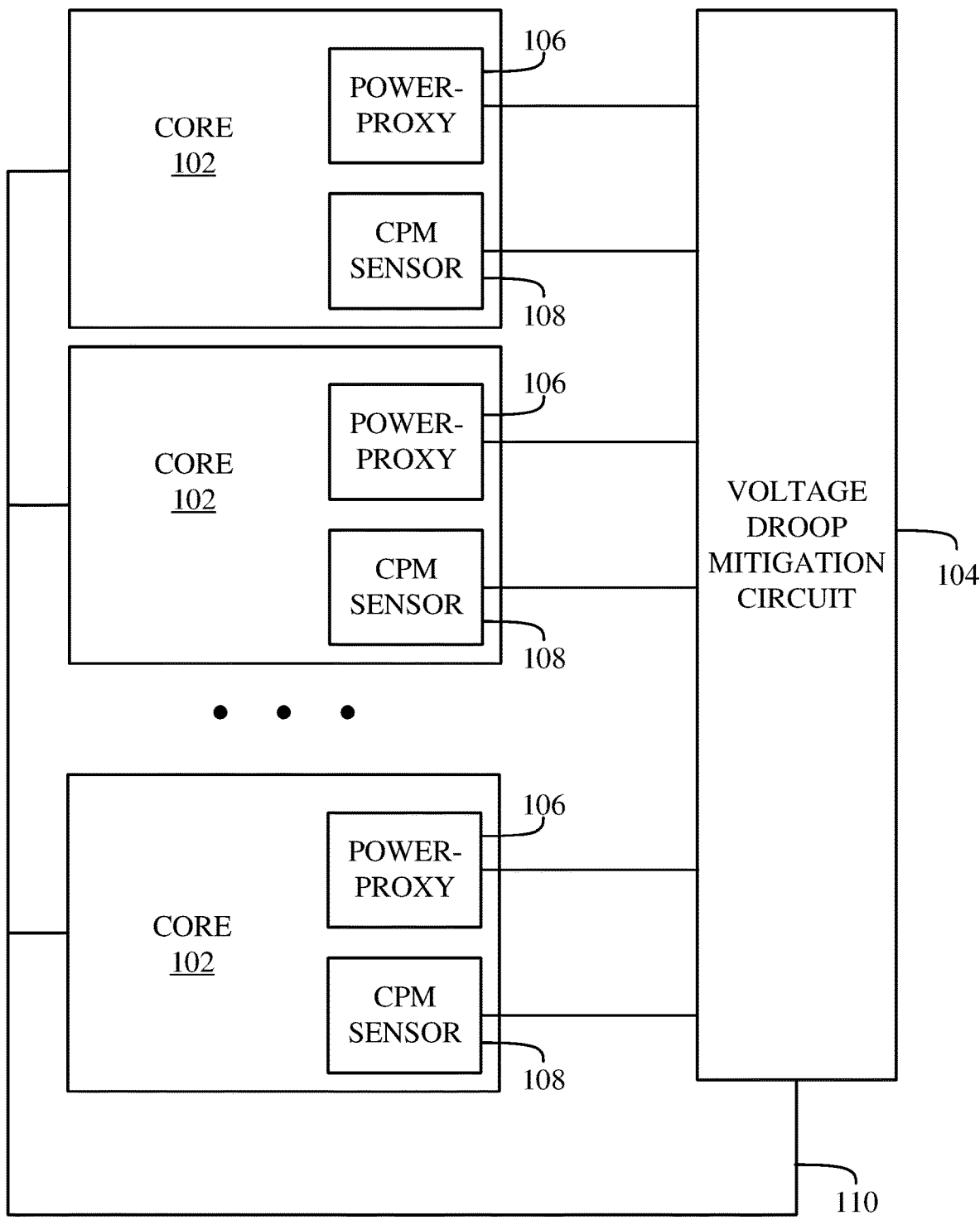
FIG. 1 illustrates a block diagram of an example computer processor, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

The sudden change in the core activity of a computer processor can result in a relatively large delta-current drawn from the power supply. Cores are also referred to herein as processor cores. Large delta-currents drawn from the power supply can cause voltage droop in the computer processor due to inductive noise. If multiple cores in a computer processor change from relatively low activity to relatively high activity in a relatively small interval of time, the voltage droop observed at all processor cores can be relatively significant, and potentially lead to a core shut-down event.

Critical-path monitor (CPM) sensors can be placed at various places in a processor core to act as monitors of voltage droop for the processor core. In a computer processor with a single clock-grid for all cores, the CPM sensors can determine the available timing margins at all the cores. The available timing margin is the difference between the time of an actual change in an electric signal and the latest time at which the electric signal can change and continue to have the electronic circuit function correctly. Further, the available timing margin is inversely proportional to the amount of voltage at the core. Thus, the lower the available timing margin is, the greater the amount of voltage is being consumed at the core. As such, a relatively low available timing margin can indicate a voltage droop. To combat voltage droop, it is possible to trigger circuits that throttle the processor core. Throttling the processor core can reduce how quickly the processor core executes instructions. Throttling the processor core when voltage droop occurs can help the core to continue executing even with a reduced voltage. In this way, throttling the processor core can prevent the processor core from failing. However, from the time at which the processor activity increases until the point in time when the CPM sensors respond to the voltage droop event, there can be a certain amount of delay, e.g., 40 to 50 processor clock-cycles. If the voltage droop is relatively large, e.g., a mid-frequency droop of about −100mV/10 ns, the CPM sensors may not be able to activate the throttling circuits in time to prevent an issue, such as a core shut-down.

Processor cores may also include digital power-proxies, which monitor power signals from the different cores. These monitored power signals can be indicators of a change in processor core activity. Further, as stated previously, a relatively large increase in processor core activity can cause a relatively large delta-current draw, and potentially, voltage droop. However, measuring just the change in digital power-proxy may not be an indication of a voltage droop event because the digital power-proxies in a core are not aware of the state of digital power proxies in other cores.

Accordingly, in embodiments of the present disclosure, a voltage droop mitigation circuit can combine the information from the digital power-proxies and the CPM sensors to proactively determine an indication of a voltage droop event. This proactive indication can provide sufficient time for the throttle actuation circuits to mitigate the effect of the voltage droop. In such embodiments, the CPM sensor can act as a real-time available timing margin indicator, and the digital power-proxies can act as activity monitors. If the CPM sensors show a relatively low timing margin and the digital power-proxies show a relatively high delta increase in processing activity, the voltage droop mitigation circuit can actuate throttling at each of the cores in the computer processor.

Referring now to FIG. 1, illustrated is a block diagram of an example computer processor 100, in accordance with embodiments of the present disclosure. The computer processor 100 can be a microprocessor found on any computing device, such as a desktop computer, mobile computing device, laptop, tablet, server computing device, blade server, rack server, cloud server, and the like.

The computer processor 100 includes multiple cores 102 and a voltage droop mitigation circuit 104. The cores 102 can be the part of the computer processor that executes instructions of computer code. The cores 102 include a power-proxy 106 and a CPM sensor 108. The power-proxy 106 may be a digital sensor that measures the amount of electric power consumed by the core 102. As processing activity increases in the core, the amount of electric power consumed can increase. As such, the measurements of the power-proxy 106 can indicate a change in the amount of processing activity by the core 102. The CPM sensor 108 can be an analog or other sensor that measures the available timing margin of the core 102. The available timing margin is the difference between the time of an actual change in signal and the latest time at which the signal can change in order for an electronic circuit to function correctly. As stated previously, the available timing margin is inversely proportional to the amount of voltage at the core, thus can also indicate a change in the core's processing activity.

The voltage droop mitigation circuit 104 can sample the measurements of the power proxies 106 and CPM sensors 108 to determine if a voltage droop event is indicated. If a voltage droop event is indicated, the voltage droop mitigation circuit 104 can send a signal along a line 110 that actuates the throttling circuits (not shown) on all the cores 102 to mitigate the voltage droop event.

Figure 2:
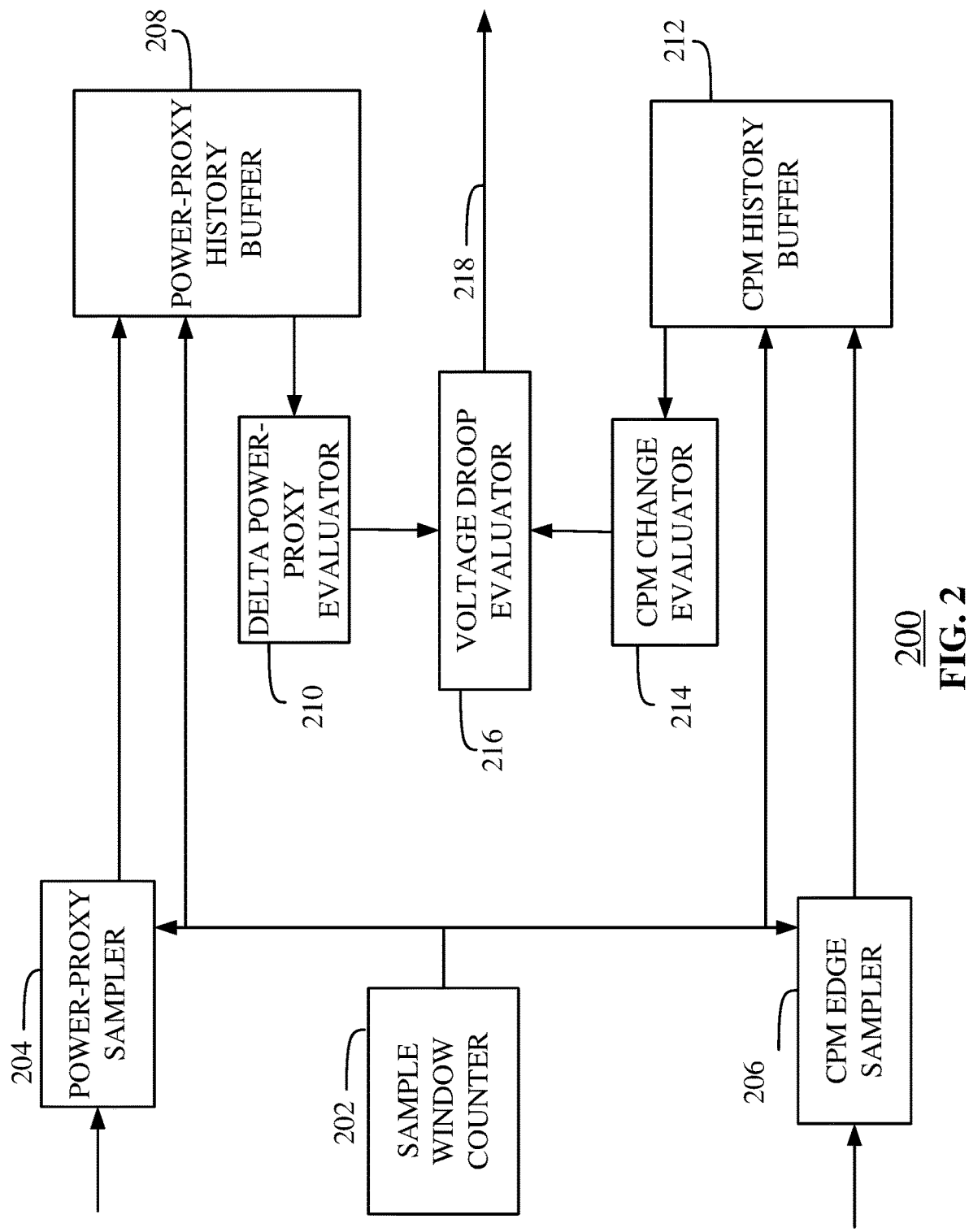
FIG. 2 illustrates a block diagram of an example voltage droop mitigation circuit, in accordance with embodiments of the present disclosure.

Referring now to FIG. 2, illustrated is a block diagram of an example voltage droop mitigation circuit 200, such as the voltage droop mitigation circuit 104 discussed above, in accordance with embodiments of the present disclosure. The voltage droop mitigation circuit 200 includes a sample window counter 202, power-proxy sampler 204, CPM edge sampler 206, power-proxy history buffer 208, CPM history buffer 212, delta power-proxy evaluator 210, CPM change evaluator 214, voltage droop evaluator 216, and line 218.

The sample window counter 202 can include an N-bit counter that runs for a predetermined number of cycles to signal the end of one sampling window, and the start of the next sampling window. The sample window counter 202 can send a signal at the beginning or end of each window to the power-proxy sampler 204 and the CPM edge sampler 206 to facilitate updates to the power-proxy history buffer 208 and the CPM history buffer 212, described in greater detail below.

The arrow pointing to the power-proxy sampler 204 represents the signals incoming from the digital power proxies of the cores, such as the digital power proxies 106 of cores 102 described with respect to FIG. 1. Referring back to FIG. 2, the power-proxy sampler 204 can periodically sample the digital power-proxy signals. Additionally, each of the digital power-proxy signals can be weighted, as determined through a calibration process. Further, the weighted signal can be summed over a predetermined sampling window to produce a power-proxy sum. The duration of the sampling window can be determined by the sample window counter 202. At the end of each sampling window, the power-proxy sum can be shifted into the power-proxy history buffer 208. The power-proxy history buffer 208 can include a number of registers, e.g., eight, which can hold the power-proxy sums for the previous eight windows of time. The power-proxy history buffer 208 is described in greater detail with respect to FIG. 3.

The delta power-proxy evaluator 210 can read the power-proxy history buffer 208 to determine the amount of change in power over the previous eight windows of time. According to embodiments of the present disclosure, the oldest half of the power-proxy sums in the power-proxy history buffer 208 can be subtracted from the newest half of the power-proxy sums in the power-proxy history buffer 208. The result of the subtraction is referred to herein as a delta power-proxy value. The selection of number of oldest and newest power-proxy sums is configurable and is described in greater detail with respect to FIG. 4.

With respect to the CPM edge sampler 206, the arrow pointing to the CPM edge sampler 206 represents the signals incoming from the CPM sensors of the cores, such as the CPM sensors 108 of cores 102 described with respect to FIG. 1. Referring back to FIG. 2, the CPM edge sampler 206 can sample the incoming CPM signals every clock cycle and check if they fall between a configurable high-edge and low-edge. According to embodiments of the present disclosure, the CPM edge sampler 206 can include a high edge sampler and a low edge sampler, wherein the high edge sampler captures the highest value that occurs in a given sampling window. Similarly, the low edge sampler captures the lowest value that occurs in a given sampling window. The CPM edge sampler 206 is described in greater detail with respect to FIG. 5.

If the incoming CPM signal is less than the high-edge, the incoming CPM signal is passed into a high-edge buffer of the CPM history buffer 212. If the incoming CPM signal is less than the low-edge, the incoming CPM signal is passed into a low-edge buffer of the CPM history buffer 212. The buffers are shifted at the end of each sampling window determined by the sample window counter 202. The CPM history buffer 212 can also include a low-edge ignore buffer to cover cases where, within a sampling window, a high-edge follows a low-edge. Such changes are discarded.

At the end of every sampling window, the CPM change evaluator 214 can check the CPM history buffer 212 to see if there was a change of CPM signals from high to low. Such a change can indicate an increase in processor core activity. If there is such a change, the CPM change evaluator 214 can provide a high-to-low signal indicator to the voltage droop evaluator 216. The CPM change evaluator 214 is described in greater detail with respect to FIG. 5.

The voltage droop evaluator 216 can evaluate the delta power-proxy value from the delta power-proxy evaluator 210 and the high-to-low signal change indicator from the CPM change evaluator 214. According to embodiments of the present disclosure, the delta power-value and the high-to-low signal change indicator can be logically "AND"ed to make the determination as to whether a voltage droop event is indicated. If a voltage droop event is indicated, the voltage droop evaluator 216 can send a signal along line 218, which can be used to actuate the throttle circuits at the cores. The voltage droop evaluator 216 is described in greater detail with respect to FIG. 6.

Figure 3:
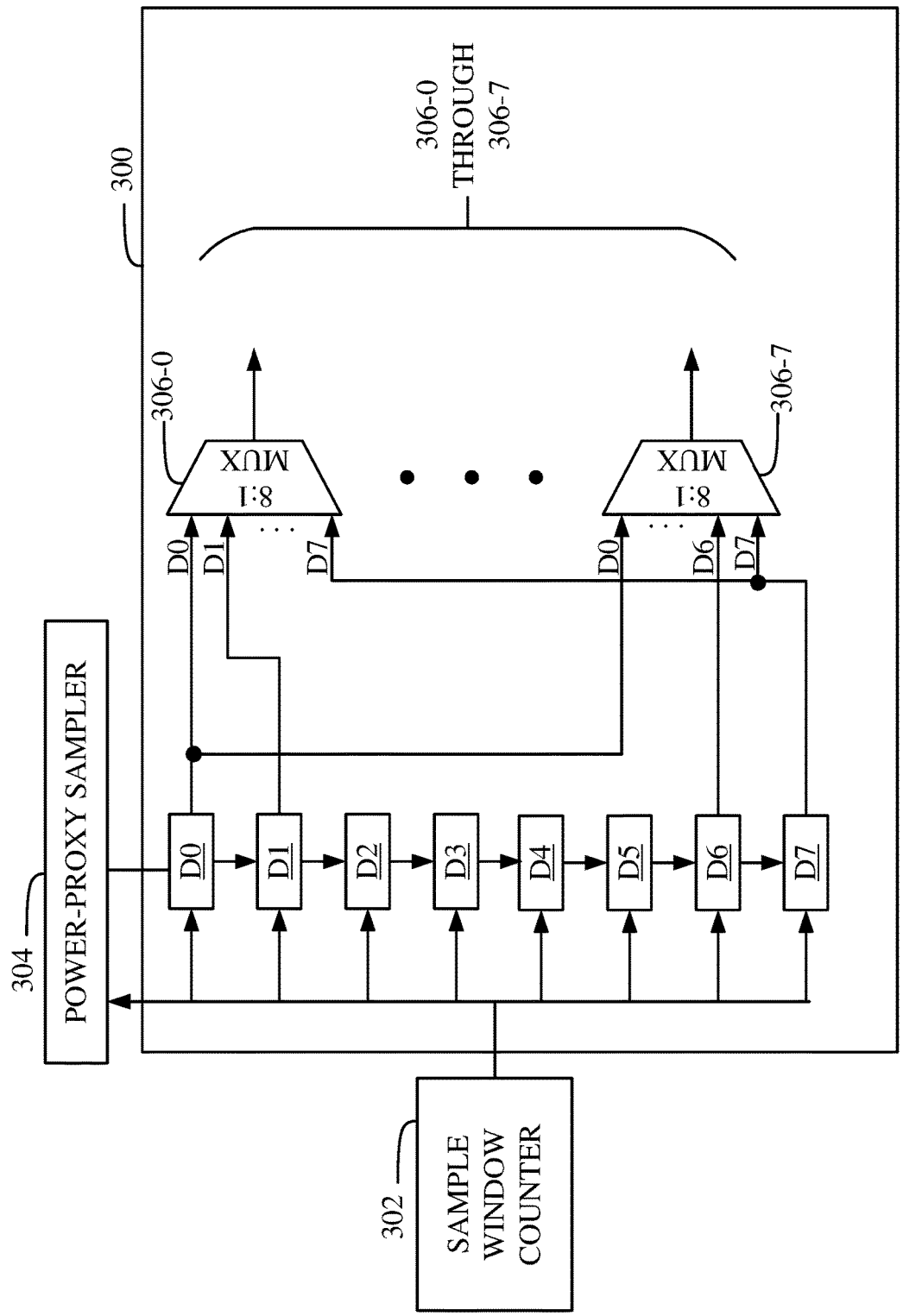
FIG. 3 illustrates a block diagram of an example power-proxy history buffer, sample window counter, and power-proxy sampler, in accordance with embodiments of the present disclosure.

Referring now to FIG. 3, illustrated is a block diagram of an example power-proxy history buffer 300, such as the power-proxy history buffer 208 discussed above, sample window counter 302, and power-proxy sampler 304, in accordance with embodiments of the present disclosure. The power-proxy history buffer 300 includes registers D0 through D7 and multiplexers (MUXs) 306-0 through 306-7. The power-proxy sampler 304 can multiply each power-proxy signal from the digital power-proxies of the cores by a predetermined weight. Further, the power-proxy sampler 304 can sum each weighted signal over the course of a sampling window. At the conclusion of the sampling window, the sample window counter 302 can signal the power-proxy history buffer 300 to shift the values in the registers D0 through D6 to registers D1 through D7, respectively. Further, the sample window counter 302 can signal the power-proxy sampler 304 to shift the power-proxy sum for the current window to the D0 register. In this way, the registers D0 through D7 can hold the power-proxy sums for each of the previous eight sampling windows.

Figure 4:
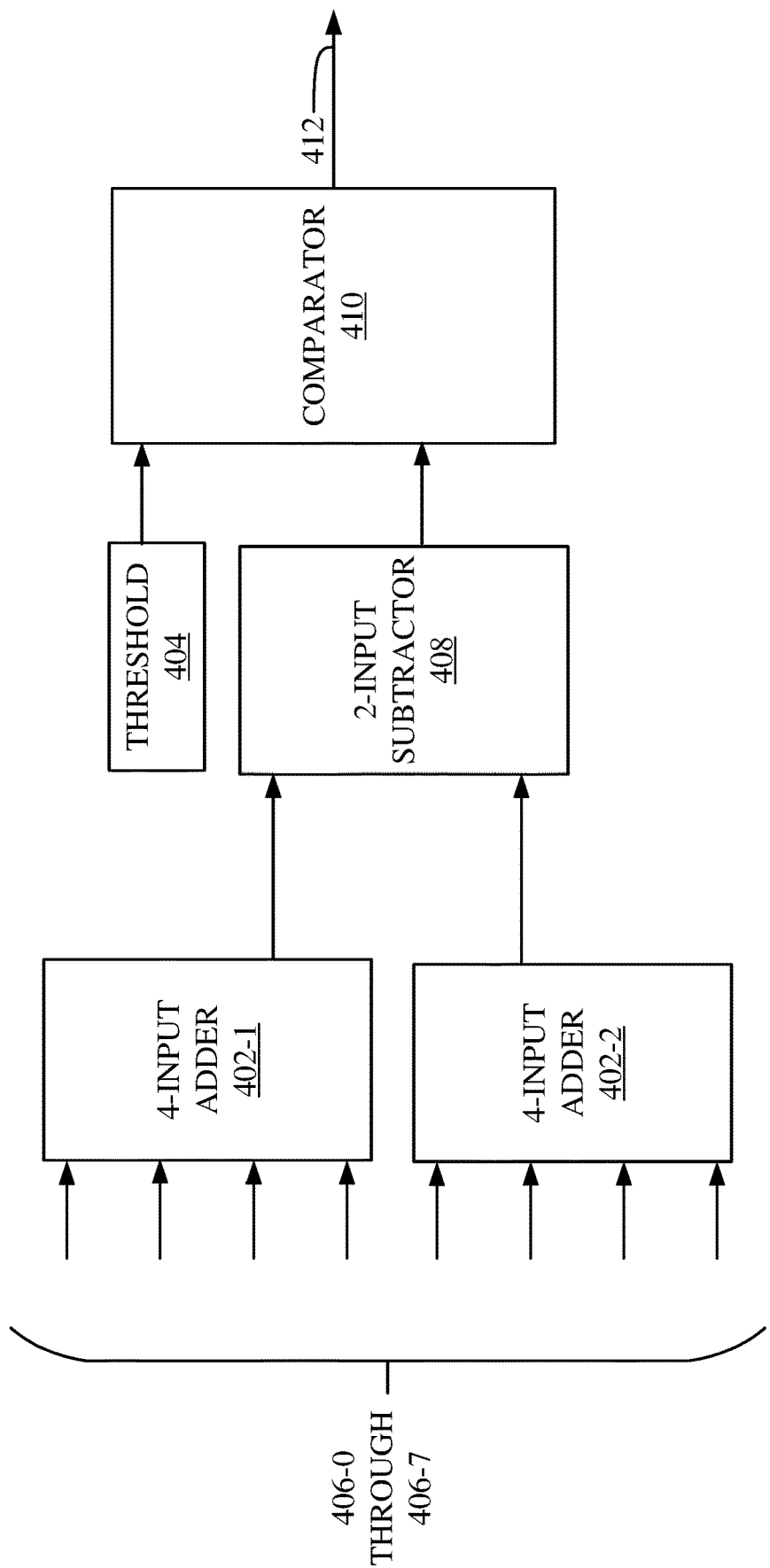
FIG. 4 illustrates a block diagram of an example delta power-proxy evaluator, in accordance with embodiments of the present disclosure.

Further, the signal from the sample window counter 302 to the power-proxy history buffer 300 can trigger the MUXs 306-0 through 306-7 to pass the values of the D0 through D7 registers, respectively to a delta power-proxy evaluator, such as, the delta power-proxy evaluator 210, 400 (FIG. 4). The muxes 306-0 to 306-7 can be used to tune the power-proxy history calculation based on given work loads or chip characteristics. Thus, the mux setting can vary based on the implementation. For example, the mux settings can be as follows: mux 306-0=D0, mux 306-1=D1, mux 306-2=D2, mux 306-3=D3, mux 306-4=D4, mux 306-5=D5, mux 306-6=D6, and mux 306-7=D7. In another example, the mux settings can be mux 306-0=D0, mux 306-1=D0, mux 306-2=D3, mux 306-3=D3, mux 306-4=D4, mux 306-5=D4, mux 306-6=D7, and mux 306-7=D7.

Referring now to FIG. 4, which illustrates a block diagram of an example delta power-proxy evaluator 400, such as the delta power-proxy evaluator 210 discussed above, in accordance with embodiments of the present disclosure. The delta power-proxy evaluator 400 includes 4-input adders 402-1, 402-2, a threshold register 404, a 2-input subtractor 408, a comparator 410, and an output line 412. The input lines 406-0 through 406-7 convey the power-proxy sums output from the MUXes 306-0 through 306-7 described with respect to FIG. 3. The power-proxy sums on lines 406-0 through 406-3 represent the four most recent sampling windows. The power-proxy sums on lines 406-4 through 406-7 represent the four sampling windows prior to the most recent. The 4-input adder 402-1 totals the power-proxy sums from the four most recent sampling windows. The 4-input adder 402-2 totals the power-proxy sums from the four sampling windows prior. Further, the 4-input adders 402-1, 402-2 output their totals to the 2-input subtractor 408. The 2-input subtractor 408 subtracts the totaled power-proxy sums of the 4-input adder 402-2 from the totaled power-proxy sums of the 4-input adder 402-1. In this way, the 2-input subtractor 408 determines the change in power consumption over an eight-window sampling. The output value from the 2-input subtractor 408 is input to the comparator 410 with a value from the threshold register 404. The threshold register 404 can hold a predetermined value that indicates a potential voltage droop if exceeded by the value output by the 2-input subtractor 408. The comparator 410 compares the value from the threshold register 404 to the output from the 2-input subtractor 408. If the value from the 2-input subtractor 408 exceeds the value from the threshold register 404, the comparator 410 can send a signal out over line 412 to a voltage droop evaluator, such as the voltage droop evaluator 216 described with reference to FIG. 2.

Figure 5:
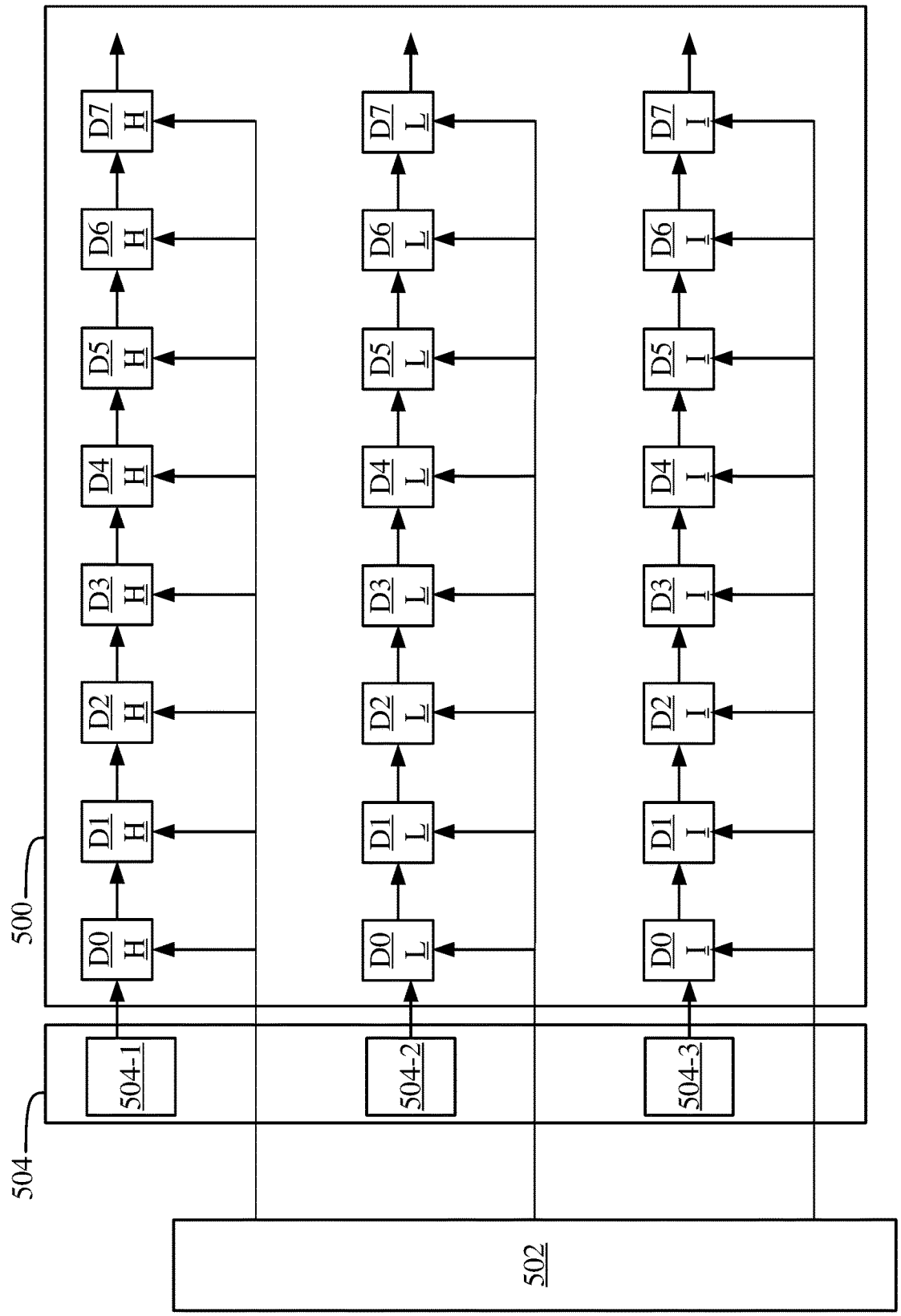
FIG. 5 illustrates a block diagram of an example CPM history buffer, in accordance with embodiments of the present disclosure.

Referring now to FIG. 5, which illustrates a block diagram of an example CPM history buffer 500, such as the CPM history buffer 212 discussed above, an example sample window counter 502, and an example CPM edge sampler 504, in accordance with embodiments of the present disclosure. The CPM history buffer 500 includes D0H through D7H high-edge history registers, D0L through D7L low-edge history registers, and D0I through D7I low-edge ignore history registers. The CPM edge sampler 504 includes a CPM high-edge capture register 504-1, CPM low-edge capture register 504-2, and CPM low-edge ignore register 504-3. The CPM edge sampler 504 captures CPM signal samples for each clock cycle. If the measure of the captured CPM signal is greater than a predetermined low-edge threshold and less than a predetermined high-edge threshold, the CPM edge sampler 504 can store the CPM signal in the CPM high-edge capture register 504-1. If the measure of the captured CPM signal is less than a predetermined low-edge threshold, the CPM edge sampler 504 can store the CPM signal in the CPM low-edge capture register 504-2. As stated previously, the CPM high-edge capture register 504-1 captures the highest value that occurs in a given sampling window, and the CPM low-edge capture register 504-2 captures the lowest value that occurs in a given sampling window. If, within the same sampling window, a high-edge signal follows a low-edge signal, the CPM edge sampler 504 can store the low-edge signal in the CPM low-edge ignore register 504-3.

At the end of each sampling window, the sample window counter 502 can signal the CPM edge sampler 504 to pass the captured CPM signal to the CPM history buffer 500. Additionally, the sample window counter 502 can signal the CPM history buffer 500 to shift the values in the history registers based on whether the incoming CPM signal is high-edge, low-edge, or low-edge ignore. Thus, at the end of a sampling window, an incoming high-edge signal results in the shift of values in the D0H through D6H high-edge history registers to D1H through D7H high-edge history registers, respectively. Further, the CPM history buffer 500 stores the incoming high-edge signal in the D0H high-edge history register. Similarly, at the end of a sampling window, an incoming low-edge signal results in the shift of values in the D0L through D6L low-edge history registers to D1L through D7L low-edge history registers, respectively. Additionally, the CPM history buffer 500 stores the incoming low-edge signal in the D0L low-edge history register. Also, at the end of a sampling window, an incoming low-edge ignore signal results in the shift of values in the D0I through D6I low-edge ignore history registers to D1I through D7I low-edge ignore history registers, respectively. Further, the CPM history buffer 500 stores the incoming low-edge ignore signal in the D0I low-edge ignore history register.

Referring back to FIG. 2, a CPM change evaluator, such as, the CPM change evaluator 214 can determine whether there is a change in the CPM signals from high-edge to low-edge. Such a change can indicate that a voltage droop is occurring. According to embodiments of the present disclosure, the CPM change evaluator 214 can determine that there is a change in the CPM signals from high-edge to low-edge under the conditions specified below in PSEUDO-CODE 1:

IF [ D0H AND D0L AND NOT DI0 ] OR
 [ D1H AND [ D0L OR (D1L AND NOT D1I) ] ] OR
 [ D2H AND [ D0L:D1L ≠ 0 OR (D2L AND NOT D2I) ] ] OR

```
[ D3H AND [ D0L:D2L ≠ 0 OR (D3L AND NOT D3I) ] ] OR
[ D4H AND [ D0L:D3L ≠ 0 OR (D4L AND NOT D4I) ] ] OR
[ D5H AND [ D0L:D4L ≠ 0 OR (D5L AND NOT D5I) ] ] OR
[ D6H AND [ D0L:D5L ≠ 0 OR (D6L AND NOT D6I) ] ] OR
[ D7H AND [ D0L:D6L ≠ 0 OR (D7L AND NOT D7I) ] ]
PSEUDOCODE 1
```

In the PSEUDOCODE 1, the long names of the CPM history buffer registers are shortened for clarity. More specifically, the terms DnH, DnL, and DnI are used to refer to the high-edge, low-edge, and low-edge ignore history registers, respectively. Thus, DnH refers to the D0H through D7H high-edge history registers, DnL refers to the D0L through D7L low-edge history registers, and so on. According to the PSEUDOCODE 1, the CPM change evaluator 214 checks to see if there is a high-edge to low-edge change in the CPM signals at any point during the previous eight sampling windows, while ignoring any low-edge to high-edge changes within a sampling window. Thus, if there is a high-edge capture in any of the previous eight sampling windows and a low-edge capture in sampling windows after the high-edge capture, then a high-edge to low-edge change in the CPM signals has occurred. However, if the high-edge and low-edge capture occur within the same sampling window, the low-edge ignore history register is checked to see if this change is a low-edge to high-edge event. If a high-edge to low-edge change in the CPM signals has occurred, the CPM change evaluator 214 can send a CPM change signal to a voltage droop evaluator, such as the voltage droop evaluator 216 described with reference to FIG. 2. If not, the CPM change evaluator 214 may not send a CPM change signal to the voltage droop evaluator 216.

Figure 6:
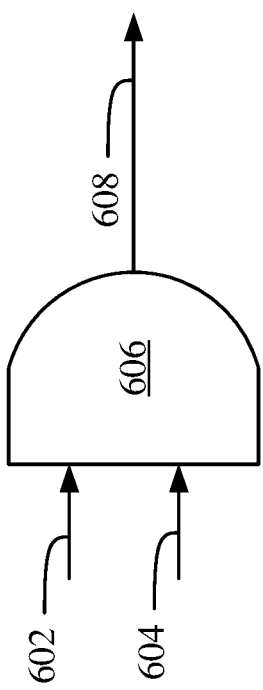
FIG. 6 illustrates a block diagram of an example voltage droop evaluator, in accordance with embodiments of the present disclosure.

Referring now to FIG. 6, which illustrates a block diagram of an example voltage droop evaluator 600, such as the voltage droop evaluator 216 discussed above, in accordance with embodiments of the present disclosure. The voltage droop evaluator 600 includes an input line 602, 604, comparator 606, and output line 608. The input line 602 can be input from a delta power-proxy evaluator, such as the delta power-proxy evaluators 210, 400 described with respect to FIGS. 2 and 4. The input line 604 can be input from a CPM change evaluator, such as the CPM change evaluator 214 described with respect to FIG. 2. If the input line 602 receives signals from both the delta power-proxy evaluator 210 and the CPM change evaluator 214 indicating a potential voltage droop, the comparator 606 can send a signal on output line 608 that actuates circuits to throttle processor cores, such as, the processor cores 102 described with respect to FIG. 1.

Figure 7:
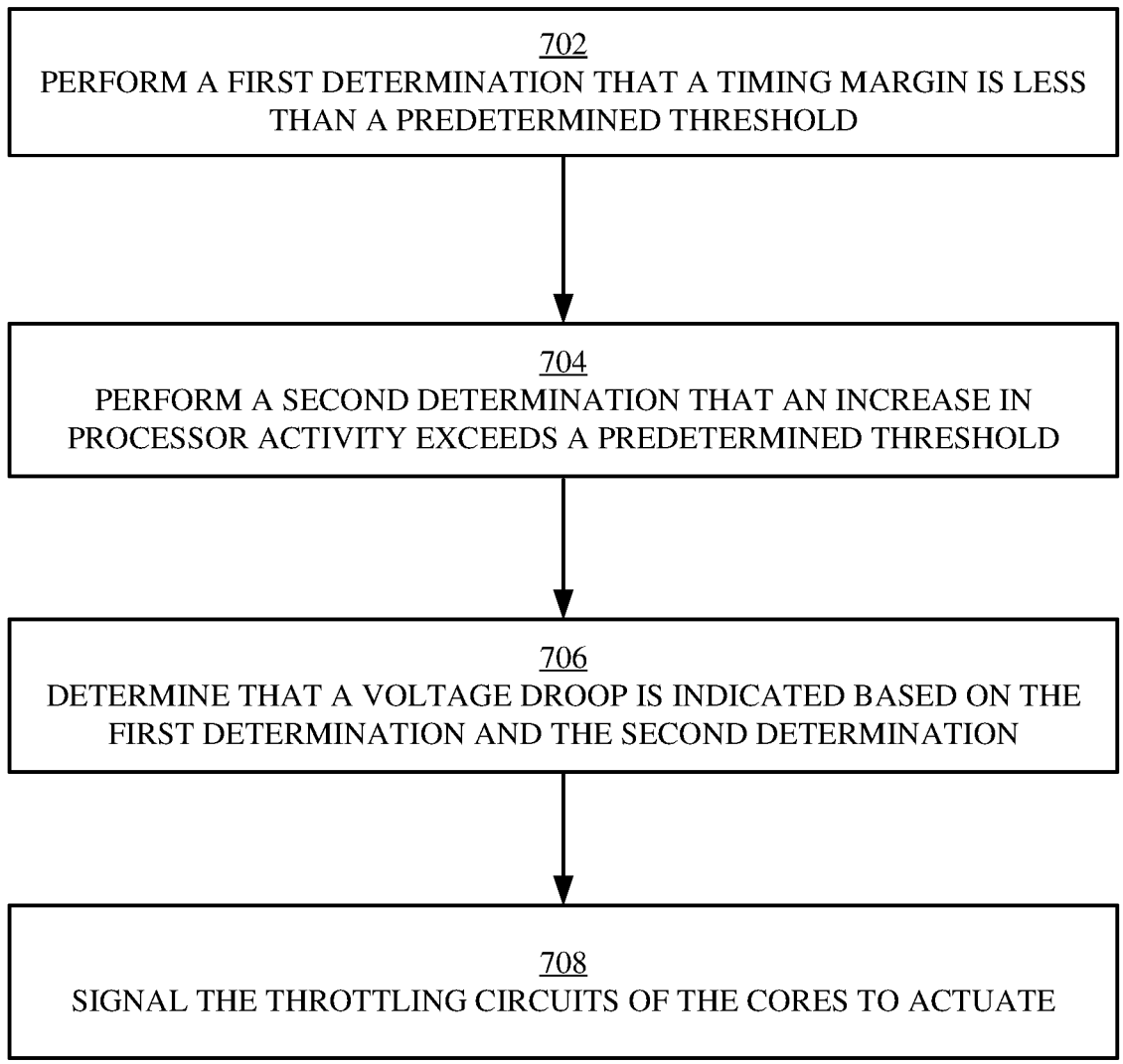
FIG. 7 illustrates a flowchart of an example method for mitigating voltage droop, in accordance with embodiments of the present disclosure.

Referring now to FIG. 7, illustrated is a flowchart of an example method 700 for mitigating voltage droop, in accordance with embodiments of the present disclosure. The method 700 can be performed by a voltage droop mitigation circuit, such as the voltage droop mitigation circuits 104, 200, described with respect to FIGS. 1 and 2. At block 702, the voltage droop mitigation circuit 104 can perform a first determination that a timing margin is less than a predetermined threshold. The voltage droop mitigation circuit 104 can perform this determination by sampling the CPM signals from CPM sensors, such as the CPM sensors 108 described with respect to FIG. 1. Further, the voltage droop mitigation circuit 104 can classify the CPM signals as high-edge or low-edge based on predetermined thresholds for high-edge and low-edge, and maintain a history of these signals within a history buffer over a predetermined number of sampling windows. The voltage droop mitigation circuit 104 may determine that the timing margin is less than a predetermined threshold if a CPM history buffer, such as, the CPM history buffer 212 shows a change from a high-edge CPM signal to a low-edge CPM signal.

At block 704, the voltage droop mitigation circuit 104 can perform a second determination that an increase in processor activity exceeds a predetermined threshold. The voltage droop mitigation circuit 104 can perform this determination by sampling signals from power-proxy sensors, such as the power-proxy sensors 106 described with respect to FIG. 1. Further, the voltage droop mitigation circuit 104 can sum weighted multiples of these power-proxy signals within a sampling window, and maintain a history of these power-proxy sums within a history buffer. Additionally, the voltage droop mitigation circuit 104 can divide the history buffer in half, and total the power-proxy sums within each half of the history. The voltage droop mitigation circuit 104 can also subtract the total of the oldest power-proxy sums from the total of the newest power-proxy sums to determine the amount of change in processor activity. Based on the amount of change and the predetermined threshold, the voltage droop mitigation circuit 104 can determine whether there is an increase in processor activity greater than the predetermined threshold.

At block 706, the voltage droop mitigation circuit 104 can determine that a voltage droop is indicated based on the first and second determinations. A voltage droop is indicated if the timing margin is less than a predetermined threshold for the timing margin and an increase in processor activity exceeds a predetermined threshold for processor activity.

At block 708, the voltage droop mitigation circuit 104 can signal the throttling circuits of the cores 102 to actuate. In this way, the cores 102 may reduce their execution speed, thus avoiding potential negative repercussions from the voltage droop, such as core shutdown.

According to embodiments of the present disclosure, the method 700 can provide a mechanism for mitigating voltage droop in a computer processor. In this way, the method 700 can provide better system performance because both the available timing margin and the power-proxy signals are considered to identify voltage droop. This represents an improvement over current systems that merely consider the available timing margin. However, by the time the available timing margin indicates a potential voltage droop, it can be too late to mitigate the effects of the voltage droop at the cores of a computer processor.

Figure 8:
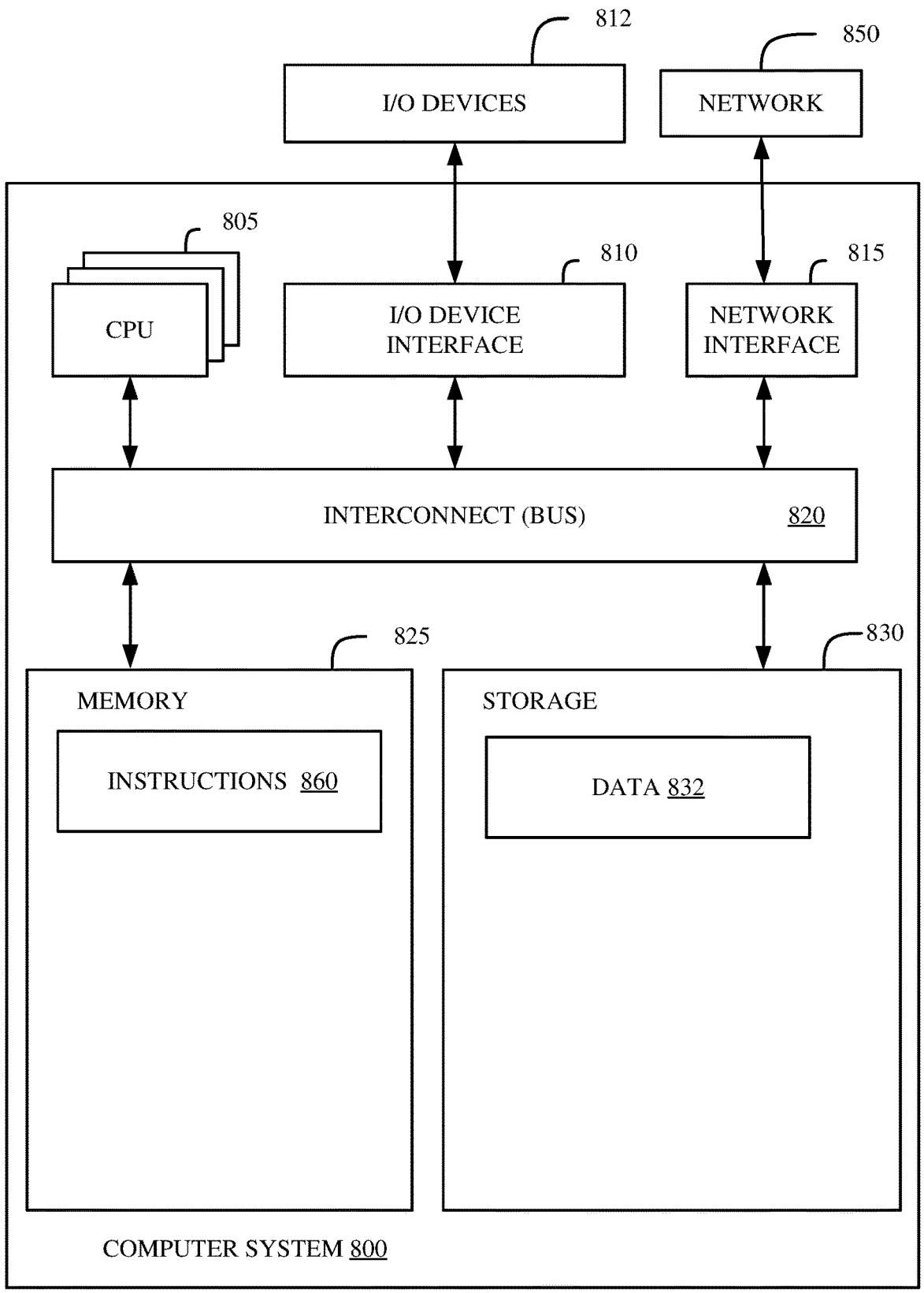
FIG. 8 illustrates a block diagram of an example computer system, in accordance with embodiments of the present disclosure.

Referring now to FIG. 8, illustrated is a block diagram of an example computer system 800, in accordance with embodiments of the present disclosure. In various embodiments, the computer system 800 can perform the method described in FIG. 7 and/or the functionality discussed in FIGS. 1-6. In some embodiments, the computer system 800 provides instructions for the aforementioned methods and/or functionalities to a client machine such that the client machine executes the method, or a portion of the method, based on the instructions provided by the computer system 800. In some embodiments, the computer system 800 comprises software executing on hardware incorporated into a plurality of devices.

The computer system 800 includes a memory 825, storage 830, an interconnect (e.g., BUS) 820, one or more CPUs 805 (also referred to as processors 805 herein), an I/O device interface 810, I/O devices 812, and a network interface 815.

Each CPU 805 retrieves and executes programming instructions stored in the memory 825 or the storage 830. Additionally, the CPUs 805 can perform any portion, or all, of the method of FIG. 7 and/or any of the functionality discussed herein. The interconnect 820 is used to move data, such as programming instructions, between the CPUs 805, I/O device interface 810, storage 830, network interface 815, and memory 825. The interconnect 820 can be implemented using one or more busses. The CPUs 805 can be a single CPU, multiple CPUs, or a single CPU having multiple processing cores in various embodiments. In some embodiments, a CPU 805 can be a digital signal processor (DSP). In some embodiments, CPU 805 includes one or more 3D integrated circuits (3DICs) (e.g., 3D wafer-level packaging (3DWLP), 3D interposer-based integration, 3D stacked ICs (3D-SICs), monolithic 3D ICs, 3D heterogeneous integration, 3D system in package (3DSiP), and/or package on package (PoP) CPU configurations). Memory 825 is generally included to be representative of a random access memory (e.g., static random access memory (SRAM), dynamic random access memory (DRAM), or Flash). The storage 830 is generally included to be representative of a non-volatile memory, such as a hard disk drive, solid state device (SSD), removable memory cards, optical storage, and/or flash memory devices. Additionally, the storage 830 can include storage area-network (SAN) devices, the cloud, or other devices connected to the computer system 800 via the I/O device interface 810 or a network 850 via the network interface 815.

In some embodiments, the memory 825 stores instructions 860 and the storage 830 stores data 832. However, in various embodiments, the instructions 860 and data 832 are stored partially in memory 825 and partially in storage 830, or they are stored entirely in memory 825 or entirely in storage 830, or they are accessed over a network 850 via the network interface 815.

Instructions 860 can be processor-executable instructions for performing any portion of, or all, any of the method of FIG. 7 and/or any of the functionality discussed herein. The data 832 may include power-proxy signal and/or CPM signal information.

In various embodiments, the I/O devices 812 include an interface capable of presenting information and receiving input. For example, I/O devices 812 can present information to a user interacting with computer system 800 and receive input from the user.

The computer system 800 is connected to the network 850 via the network interface 815. Network 850 can comprise a physical, wireless, cellular, or different network.

In some embodiments, the computer system 800 can be a multi-user mainframe computer system, a single-user system, or a server computer or similar device that has little or no direct user interface but receives requests from other computer systems (clients). Further, in some embodiments, the computer system 800 can be implemented as a desktop computer, portable computer, laptop or notebook computer, tablet computer, pocket computer, telephone, smart phone, network switches or routers, or any other appropriate type of electronic device.

FIG. 8 depicts the representative major components of an example computer system 800. In some embodiments, however, individual components can have greater or lesser complexity than as represented in FIG. 8, components other than or in addition to those shown in FIG. 8 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:
1. A computer-implemented method comprising:
  performing a first determination that a timing margin is less than a first threshold, wherein the first threshold comprises a high-edge threshold and a low-edge threshold, and wherein performing the first determination comprises:
    generating a history of critical-path monitor sensor signals within a plurality of sampling windows, wherein the history comprises a plurality of high- edge critical-path monitor (CPM) signals and a plurality of low-edge CPM signals;
identifying the high-edge CPM signals based on the high-edge threshold and the low-edge threshold;
identifying the low-edge CPM signals based on the high-edge threshold and the low-edge threshold; and
determining that one of the low-edge CPM signals occurs after one of the high-edge CPM signals within the history;
performing a second determination that an increase in processor activity exceeds a second threshold;
determining that a voltage droop is indicated based on the first determination and the second determination; and
signaling a plurality of throttling circuits for a corresponding plurality of cores of a computer processor to actuate based on the determination.

2. The method of claim 1, wherein performing the second determination comprises:
generating a history of digital power-proxy sensor signals within a plurality of sampling windows;
totaling a first half of the history;
totaling a second half of the history;
subtracting the totaled second half from the totaled first half to generate the increase in processor activity; and
comparing the increase in processor activity to the second threshold.

3. The method of claim 2, wherein the history of digital power-proxy signals comprises eight sampling windows.

4. The method of claim 3, wherein the first half of the history of digital power-proxy signals comprises a first four of the eight sampling windows, and the second half of the history of digital power-proxy signals comprises a last four of the eight sampling windows.

5. The method of claim 2, the method further comprising generating a sampling window comprising a predetermined number of clock cycles, wherein at an end of the sampling window:
the history of critical-path monitor sensor signals is shifted by one; and
the history of digital power-proxy sensor signals is shifted by one.

6. The method of claim 5, wherein at the end of the sampling window:
a current critical-path monitor sensor signal is shifted into the history of critical-path monitor signals; and
a current digital power-proxy sensor signal is shifted into the history of digital power-proxy sensor signals.

7. An apparatus comprising an electric circuit configured to:
perform a first determination that a timing margin is less than a first threshold, wherein the first threshold comprises a high-edge threshold and a low-edge threshold, and wherein performing the first determination comprises:
generating a history of critical-path monitor sensor signals within a plurality of sampling windows, wherein the history comprises a plurality of high-edge critical-path monitor (CPM) signals and a plurality of low-edge CPM signals;
identifying the high-edge CPM signals based on the high-edge threshold and the low-edge threshold;
identifying the low-edge CPM signals based on the high-edge threshold and the low-edge threshold; and
determining that one of the low-edge CPM signals occurs after one of the high-edge CPM signals within the history;
perform a second determination that an increase in processor activity exceeds a second threshold;
determine that a voltage droop is indicated based on the first determination and the second determination; and
signal a plurality of throttling circuits for a corresponding plurality of cores of a computer processor to actuate.

8. The apparatus of claim 7, wherein performing the second determination comprises:
generating a history of digital power-proxy sensor signals within a plurality of sampling windows;
totaling a first half of the history;
totaling a second half of the history;
subtracting the totaled second half from the totaled first half to generate the increase in processor activity; and
comparing the increase in processor activity to the second threshold.

9. The apparatus of claim 8, wherein the history of digital power-proxy signals comprises eight sampling windows.

10. The apparatus of claim 9, wherein the first half of the history of digital power-proxy signals comprises a first four of the eight sampling windows, and the second half of the history of digital power-proxy signals comprises a last four of the eight sampling windows.

11. The apparatus of claim 8, the apparatus further configured to generate a sampling window comprising a predetermined number of clock cycles, wherein at an end of the sampling window:
the history of critical-path monitor sensor signals is shifted by one; and
the history of digital power-proxy sensor signals is shifted by one.

12. The apparatus of claim 11, wherein at the end of the sampling window:
a current critical-path monitor sensor signal is shifted into the history of critical-path monitor signals; and
a current digital power-proxy sensor signal is shifted into the history of digital power-proxy sensor signals.

13. A system comprising:
a computer processing circuit comprising a plurality of cores; and
a voltage droop mitigation circuit, which, when activated, is configured to:
perform a first determination that a timing margin is less than a first threshold, wherein the first threshold comprises a high-edge threshold and a low-edge threshold, and wherein performing the first determination comprises:
generating a history of critical-path monitor sensor signals within a plurality of sampling windows, wherein the history comprises a plurality of high-edge critical-path monitor (CPM) signals and a plurality of low-edge CPM signals;
identifying the high-edge CPM signals based on the high-edge threshold and the low-edge threshold;
identifying the low-edge CPM signals based on the high-edge threshold and the low-edge threshold; and
determining that one of the low-edge CPM signals occurs after one of the high-edge CPM signals within the history;
perform a second determination that an increase in processor activity exceeds a second threshold;
determine that a voltage droop is indicated based on the first determination and the second determination; and
signal a plurality of throttling circuits corresponding to the plurality of cores to actuate.

14. The system of claim 13, wherein performing the second determination comprises:
   generating a history of digital power-proxy sensor signals within a plurality of sampling windows;
   totaling a first half of the history of digital power-proxy signals;
   totaling a second half of the history of digital power-proxy signals;
   subtracting the totaled second half from the totaled first half to generate the increase in processor activity; and
   comparing the increase in processor activity to the second threshold.

15. The system of claim 14, wherein the history of digital power-proxy signals comprises eight sampling windows, and wherein the first half of the history of digital power-proxy signals comprises a first four of the eight sampling windows, and wherein the second half of the history of digital power-proxy signals comprises a last four of the eight sampling windows.

16. The system of claim 14, wherein the voltage droop mitigation circuit, when activated, is further configured to generate a sampling window comprising a predetermined number of clock cycles, wherein at an end of the sampling window:
   the history of critical-path monitor sensor signals is shifted by one; and
   the history of digital power-proxy sensor signals is shifted by one.

17. The system of claim 16, wherein at the end of the sampling window:
   a current critical-path monitor sensor signal is shifted into the history of critical-path monitor signals; and
   a current digital power-proxy sensor signal is shifted into the history of digital power-proxy sensor signals.

* * * * *